US012138578B2

(12) United States Patent
Minezawa et al.

(10) Patent No.: US 12,138,578 B2
(45) Date of Patent: Nov. 12, 2024

(54) CANISTER

(71) Applicant: FUTABA INDUSTRIAL CO., LTD., Okazaki (JP)

(72) Inventors: Shogo Minezawa, Okazaki (JP); Yoshiki Kisato, Okazaki (JP); Tatsuya Funabashi, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 186 days.

(21) Appl. No.: 17/962,257

(22) Filed: Oct. 7, 2022

(65) Prior Publication Data

US 2023/0149846 A1    May 18, 2023

(30) Foreign Application Priority Data

Nov. 12, 2021  (JP) .................................. 2021-185057

(51) Int. Cl.
*B01D 53/04* (2006.01)
*F02M 25/08* (2006.01)

(52) U.S. Cl.
CPC ..... *B01D 53/0415* (2013.01); *B01D 53/0446* (2013.01); *B01D 2259/403* (2013.01);
(Continued)

(58) Field of Classification Search
CPC ............ B01D 53/0415; B01D 53/0446; B01D 53/0407; B01D 2259/4516; B01D 2257/702; F02M 25/0836; F02M 25/0854
See application file for complete search history.

(56) References Cited

U.S. PATENT DOCUMENTS 8,992,673 B2 *  3/2015  Mani ...................... B01D 53/04
                                                96/132
11,149,694 B2 * 10/2021  Seki ........................ F02M 25/08
(Continued)

FOREIGN PATENT DOCUMENTS

JP       2012036734 A    2/2012
JP       2012149620 A    8/2012
(Continued)

OTHER PUBLICATIONS

Notice of Reasons for Refusal for Japanese Patent Application No. 2021185057, mailed Sep. 26, 2023, 8 pages.

*Primary Examiner* — Phutthiwat Wongwian
*Assistant Examiner* — Sherman D Manley
(74) *Attorney, Agent, or Firm* — Withrow + Terranova PLLC; Vincent K. Gustafson (57) ABSTRACT

Provided is a canister that can inhibit discharge of evaporated fuel to the atmosphere. One aspect of the present disclosure is a canister. The canister includes a charge port, a purge port, an atmosphere port, a main chamber to which a charge port and a purge port are connected, a sub chamber to which the atmosphere port is connected, an intermediate chamber arranged between the main chamber and the sub chamber in a flow path of an evaporated fuel, the intermediate chamber being connected to each of the main chamber and the sub chamber, a first adsorbent stored in the main chamber, second adsorbent stored in the sub chamber, and a third adsorbent stored it intermediate chamber. An adsorption capacity of the third adsorbent is smaller than each of an adsorption capacity of the first adsorbent and an adsorption capacity of the second adsorbent.

4 Claims, 6 Drawing Sheets

(52) U.S. Cl.
 CPC .  *B01D 2259/4516* (2013.01); *F02M 25/0836* (2013.01); *F02M 25/0854* (2013.01)

(56) References Cited

U.S. PATENT DOCUMENTS

| | | | | |
|---|---|---|---|---|
| 2012/0186563 A1* | 7/2012 | Hasegawa | ........... | F02M 25/0854 123/519 |
| 2012/0304865 A1* | 12/2012 | Sugiura | .............. | F02M 25/0854 96/131 |
| 2013/0037006 A1* | 2/2013 | Kosugi | .............. | F02M 25/0854 123/520 |
| 2015/0007799 A1* | 1/2015 | Takeshita | ........... | F02M 25/0854 123/519 |
| 2017/0002770 A1* | 1/2017 | Kosugi | ................... | B01D 53/04 |
| 2019/0249624 A1* | 8/2019 | Seki | ................... | B01D 53/0407 |
| 2021/0016219 A1 | 1/2021 | Kosugi | | |

FOREIGN PATENT DOCUMENTS

| | | | |
|---|---|---|---|
| JP | 2012251431 | A | 12/2012 |
| JP | 5843484 | B2 | 1/2016 |
| JP | 2021017839 | A | 2/2021 |

* cited by examiner

CANISTER

CROSS-REFERENCE TO RELATED APPLICATIONS

This application claims the benefit of priority based on Japanese patent application No. 2021-185057 filed on Nov. 12, 2021 with the Japan Patent Office and the entire disclosure of which is incorporated herein by reference.

BACKGROUND

The present disclosure relates to a canister.

A canister, which inhibits the discharge of evaporated fuel to the atmosphere, is attached to a fuel tank of a vehicle. The canister adsorbs the evaporated fuel to an adsorbent, desorbs fuel from the adsorbent with taken-in air for purging, and supplies the purged fuel to an engine.

Generally, the canister at least includes a main chamber to which a charge port is connected, and a sub chamber connected to the main chamber. Each of the main chamber and the sub chamber contains an adsorbent. In such a canister, when a large amount of evaporated fuel is supplied from the charge port, the evaporated fuel that was not adsorbed in the main chamber and the sub chamber may be discharged from the atmosphere port.

Thus, a canister provided with a blow-by prevention part is known to inhibit the discharge of the evaporated fuel from the sub chamber to the atmosphere (see Japanese Unexamined Patent Application Publication No. 2012-36734).

SUMMARY

In the above-described canister, the blow-by prevention part is arranged adjacent to the atmosphere port. Thus, the evaporated fuel might be discharged to the atmosphere.

In one aspect of the present disclosure, it is preferable to provide a canister that can inhibit discharge of evaporated fuel to the atmosphere.

One aspect of the present disclosure is a canister for absorbing and desorbing evaporated fuel occurred in a fuel tank of a vehicle. The canister includes a charge port that takes in evaporated fuel, a purge port that discharges the evaporated fuel, an atmosphere port open to the atmosphere, a main chamber to which the charge port and the purge port are connected, a sub chamber to which the atmosphere port is connected directly or through another chamber, an intermediate chamber arranged between the main chamber and the sub chamber in a flow path of the evaporated fuel, the intermediate chamber being connected to each of the main chamber and the sub chamber, a first adsorbent stored in the main chamber, a second adsorbent stored in the sub chamber, and a third adsorbent stored in the intermediate chamber. An adsorption capacity of the third adsorbent as a whole is smaller than each of an adsorption capacity of the first adsorbent as a whole and an adsorption capacity of the second adsorbent as a whole.

With this configuration, it is possible to delay the moving of the evaporated fuel, which was not adsorbed in the main chamber, to the sub chamber. Thus, it is possible to reduce the discharge of the evaporated fuel to the atmosphere. The adsorption capacity of the third adsorbent as a whole in the intermediate chamber is made smaller than the adsorption capacity of the first adsorbent as a whole and the adsorption capacity of the second adsorbent as a whole, and thus, the intermediate chamber can be made compact. As a result, it is possible to inhibit the upsizing of the canister while reducing the discharge of the evaporated fuel to the atmosphere.

In one aspect of the present disclosure, in the intermediate chamber, a ratio (L/D) of a length L [mm] in a gas flow direction to an equivalent diameter D [mm] in a cross section perpendicular to the gas flow direction may be equal to or less than 1. With this configuration, a ventilation resistance of the intermediate chamber can be reduced. In addition, the length of the intermediate chamber can be reduced, which promotes the effect of inhibiting the upsizing of the canister.

In one aspect of the present disclosure, the equivalent diameter in the cross section perpendicular to the gas flow direction in the intermediate chamber may be equal to or less than an equivalent diameter in a cross section perpendicular to a gas flow direction in the sub chamber and less than an equivalent diameter in a cross section perpendicular to a gas flow direction in the main chamber. With this configuration, desorption properties of the third adsorbent in the intermediate chamber can be enhanced. As a result, an adsorption effect of the intermediate chamber at the time of re-absorption of the evaporated fuel increases, which promotes the effect of reducing the discharge of the evaporated fuel to the atmosphere.

One aspect of the present disclosure may further include a flow path forming member connected to an end of the main chamber on a side opposite the charge port of the main chamber, and a spring that presses the flow path forming member toward the main chamber. The intermediate chamber may be arranged inside the flow path forming member. With this configuration, the intermediate chamber can be formed by utilizing a part of the structure of the flow path. Thus, it is possible to promote the effect of inhibiting the upsizing of the canister.

One aspect of the present disclosure may further include a communicating passage that connects the main chamber and the sub chamber to communicate with each other. The intermediate chamber may be arranged in the communicating passage. With this configuration, the intermediate chamber can be formed by utilizing a part of the communicating passage. Thus, it is possible to promote the effect of inhibiting the upsizing of the canister.

In one aspect of the present disclosure, the communicating passage may have a crank portion that bends a gas flow direction. The intermediate chamber may be arranged in the crank portion. With this configuration, the main chamber and the sub chamber can have structures similar to conventional structures.

In one aspect of the present disclosure, the communicating passage may have a linear part aligned linearly with the sub chamber. The intermediate chamber may be arranged in the linear part. This configuration makes it easy to arrange the intermediate chamber and to hold the third adsorbent.

It should be noted that the "equivalent diameter in the cross section perpendicular to the gas flow direction" means a value obtained by calculating a diameter ($D=(S/\pi)^{1/2} \times 2$) of a perfect circle having an area S that is the same as a cross-sectional area perpendicular to the gas flow direction in each chamber, and by averaging the diameters along the gas flow direction in each chamber.

BRIEF DESCRIPTION OF THE DRAWINGS

Embodiments of the present disclosure will be described hereinafter by way of example with reference to the accompanying drawings, in which.

DETAILED DESCRIPTION OF EXEMPLARY EMBODIMENTS

1. First Embodiment

[1-1. Configuration]

Figure 1:
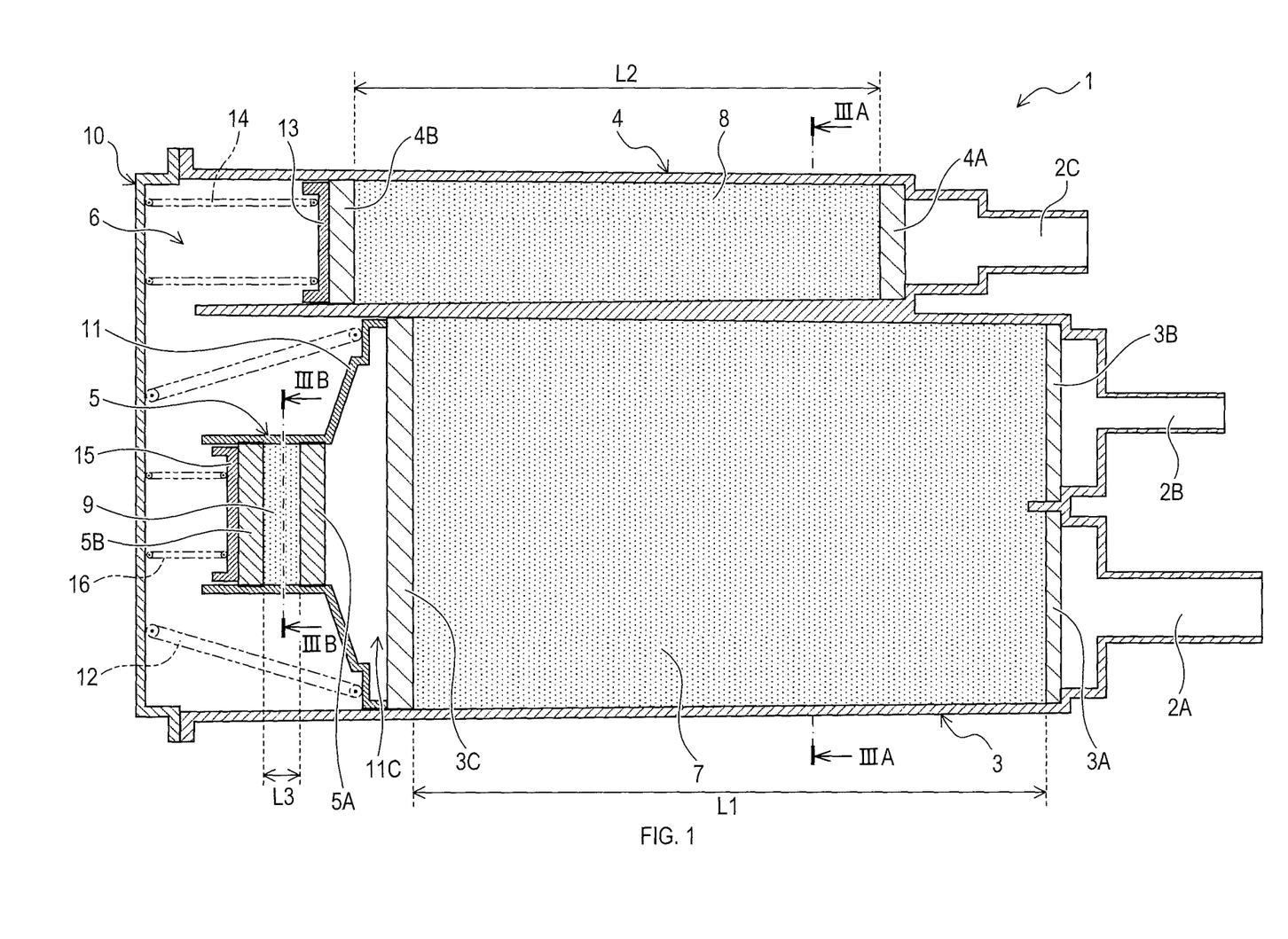
FIG. 1 is a schematic sectional view of a canister in an embodiment.

A canister 1 shown in FIG. 1A adsorbs and desorbs evaporated fuel occurred in a fuel tank of a vehicle.

The canister 1 includes a charge port 2A, a purge port 2B, an atmosphere port 2C, a main chamber 3, a sub chamber 4, an intermediate chamber 5, a communicating passage 6, a first adsorbent 7, a second adsorbent 8, and a third adsorbent 9.

<Port>

The charge port 2A is connected to the fuel tank of the vehicle via piping, The charge port 2A is configured to take the evaporated fuel generated in the fuel tank into the canister 1.

The purge port 2B is connected to an intake pipe of an engine of the vehicle via a purge valve. The purge port 2B is configured to discharge the evaporated fuel from the canister 1 and supply it to the engine.

The atmosphere port 2C is connected to a filling port of the vehicle via piping, and is open to the atmosphere. The atmosphere port 2C discharges gas from which the evaporated fuel has been removed to the atmosphere. The atmosphere port 2C also takes in external air (i.e. purge air) to desorb (i.e. purge) the evaporated fuel absorbed in the canister 1.

<Main Chamber>

The main chamber 3 stores the first adsorbent 7, and adsorbs the evaporated fuel taken in from the charge port 2A. The main chamber 3 also discharges the adsorbed evaporated fuel from the purge port 2B.

The main chamber 3 is defined by a first filter 3A, a second filter 3B, and a third filter 3C arranged inside the housing 10 of the canister 1. The first filter 3A separates the charge port 2A connected to the main chamber 3 from a storage space for the adsorbent of the main chamber 3. The second filter 3B separates the purge port 2B connected to the main chamber 3 from the storage space for the adsorbent of the main chamber 3.

The third filter 3C separates an inner space of the flow path forming member 11 connected to the main chamber 3 from the storage space for the adsorbent in the main chamber 3. The third filter 3C is pressed toward the charge port 2A and the purge port 2B by a first spring 12 through the flow path forming member 11.

The first filter 3A, the second filter 3B, and the third filter 3C are configured to allow gas to pass through while not allowing the first adsorbent 7 to pass through. That is, the filters 3A, 3B, and 3C hold the first adsorbent 7 therebetween in the main chamber 3.

<Sub Chamber>

The sub chamber 4 stores the second adsorbent 8, and communicates with the main chamber 3 so that gas can flow freely between the main chamber 3 through the intermediate chamber 5 and the communicating passage 6. The sub chamber 4 is arranged side by side with the main chamber 3 in a radial direction of the main chamber 3 so that a gas flow direction is parallel to the main chamber 3.

The sub chamber 4 is defined by a first filter 4A and a second filter 4B arranged inside the housing 10 of the canister 1. The first filter 4A separates the atmosphere port 2C connected to the sub chamber 4 from a storage space for the adsorbent of the sub chamber 4. The second filter 4B separates the communicating passage 6 from the storage space for the adsorbent of the sub chamber 4.

The second filter 4B is pressed toward the atmosphere port 2C by a second spring 14 through a resin grid 13 having a grid shape. The first filter 4A and the second filter 4B defining the sub chamber 4 have functions similar to those of the filters 3A, 3B, and 3C of the main chamber 3.

<Intermediate Chamber>

The intermediate chamber 5 stores the third adsorbent 9, and is arranged between the main chamber 3 and the sub chamber 4 in a flow path of the evaporated fuel.

The intermediate chamber 5 is defined by a first filter 5A and a second filter 5B arranged inside the resin flow path forming member 11 connected to an end (i.e. the third filter 3C) opposite the charge port 2A of the main chamber 3. That is, the intermediate chamber 5 is arranged inside the flow path forming member 11, in FIG. 2A and FIG. 2B, the flow path forming member 11 has a tapered portion 11A and a cylindrical portion 11B.

Figure 2A:
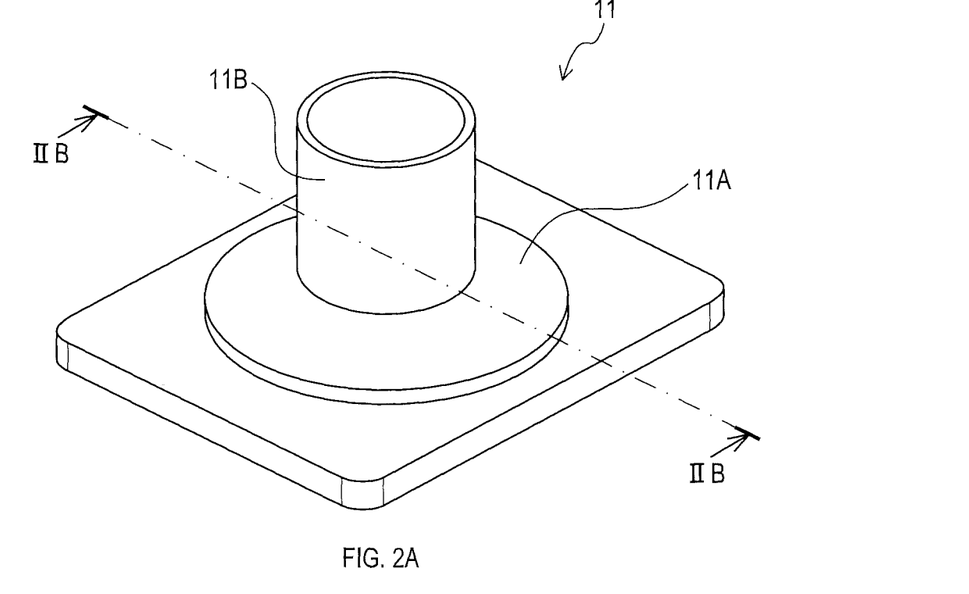
FIG. 2A is a schematic perspective view of a flow path component in the canister of FIG. 1.
Figure 2B:
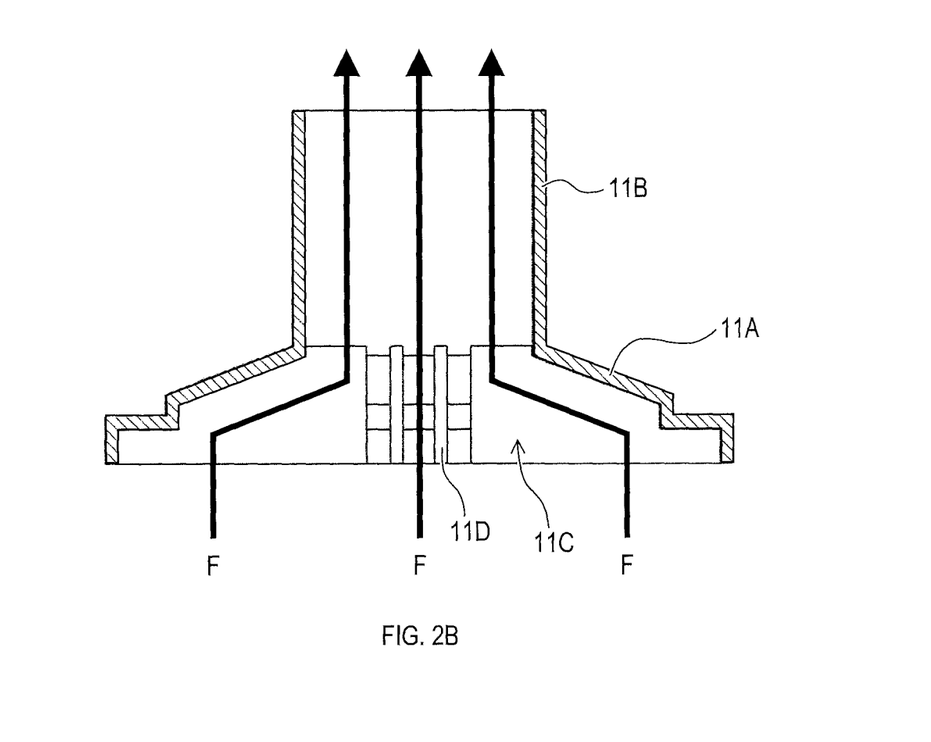
FIG. 2B is a schematic sectional view taken along line IIB-IIB of FIG. 2A.

The tapered portion 11A is a portion having an inner space 11C gradually reduced in diameter toward a side opposite the main chamber 3. The tapered portion 11A is pressed toward the third filter 3C by the first spring 12 (see FIG. 1). That is, the first spring 12 presses the flow path forming member 11 toward the main chamber 3.

In the inner space 11C of the tapered portion 11A, a rib 11D is arranged. The rib 11D is formed into a grid shape through which the evaporated fuel F can pass. The rib 11D supports the first filter 5A.

The cylindrical portion 11B is connected to an end of the tapered portion 11A opposite the main chamber 3. The cylindrical portion 11B is a pipe body having a circular cross section. The intermediate chamber 5 is configured of a part of an inner space of the cylindrical portion 11B.

The first filter 5A separates the inner space 11C of the tapered portion 11A from a storage space for the adsorbent of the intermediate chamber 5. The second filter 5B separates the communicating passage 6 from the storage space for the adsorbent of the intermediate chamber 5.

Each of the first filter 5A and the second filter 5B is arranged inside the cylindrical portion 11B. The second filter 5B is pressed toward the main chamber 3 by a third spring 16 through a resin grid 15 having a grid shape. The first filter 5A and the second filter 5B defining the intermediate chamber 5 have functions similar to those of the filters 3A, 3B, and 3C of the main chamber 3.

The intermediate chamber 5 is connected to the main chamber 3 through the inner space of the tapered portion 11A. The intermediate chamber 5 is also connected to sub chamber 4 through a space forming the communicating passage 6. That is, there are buffer spaces without an adsorbent between the intermediate chamber 5 and the main chamber 3, and between the intermediate chamber 5 and the sub chamber 4. These buffer spaces can delay the discharge of the evaporated fuel to the atmosphere.

<Communicating Passage>

The communicating passage 6 is a space to connect the sub chamber 4 and the intermediate chamber 5 to communicate with each other. The sub chamber 4 communicates with the main chamber 3 through the intermediate chamber 5 and the communicating passage 6. The only flow path to connect the main chamber 3 and the sub chamber 4 is a flow path composed of the intermediate chamber 5 and the communicating passage 6.

The evaporated fuel taken in from the charge port 2A is adsorbed into the first adsorbent 7 in the main chamber 3. The evaporated fuel that was not adsorbed in the main chamber 3 moves through the tapered portion 11A of the flow path forming member 11 to the intermediate chamber 5 and is adsorbed into the third adsorbent 9 in the intermediate chamber 5.

Furthermore, the evaporated fuel that was not adsorbed in the intermediate chamber 5 moves through the communicating passage 6 to the sub chamber 4, and is adsorbed into the second adsorbent 8 in the sub chamber 4. The gas from which the evaporated fuel was adsorbed is released from the atmosphere port 2C.

By supplying the air from the atmosphere port 2C, the evaporated fuel adsorbed into the adsorbent in each of the sub chamber 4, the intermediate chamber 5, and the main chamber 3 by is discharged from the purge port 2B to the engine. As a result, the air containing the evaporated fuel is supplied to the engine.

<Dimensions of Each Chamber>

The relations of a length L1 of the main chamber in the gas flow direction 3, a length L2 of the sub chamber 4 in the gas flow direction, and a length L3 of the intermediate chamber 5 in the gas flow direction shown in FIG. 1 are described below in Expression (1).

$$L2>L3, L1>L3 \quad (1)$$

That is, the length L3 of the intermediate chamber 5 is less than the length L2 of the sub chamber 4 and the length L1 of the main chamber 3. In the present embodiment, the length L2 is less than the length L1 (L2<L1); however, the length L2 may be equal to or more than the length L1 (L2≥L).

Figure 3A:
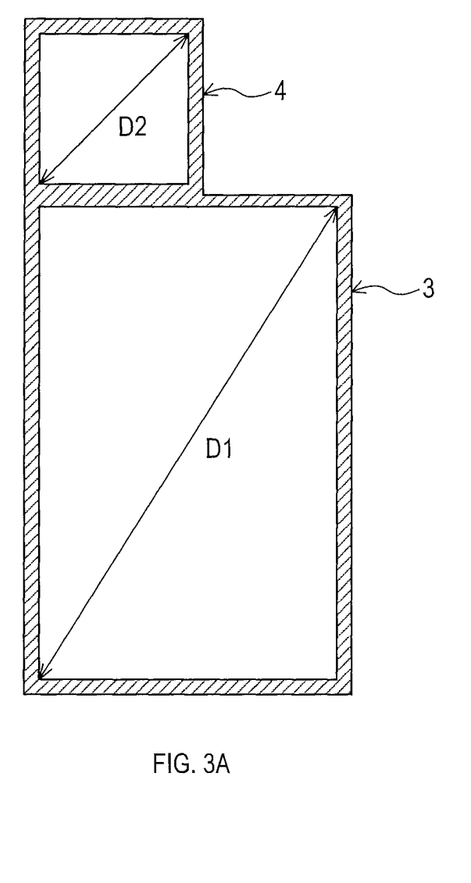
FIG. 3A is a schematic sectional view taken along line IIIA-IIIA of FIG. 1.
Figure 3B:
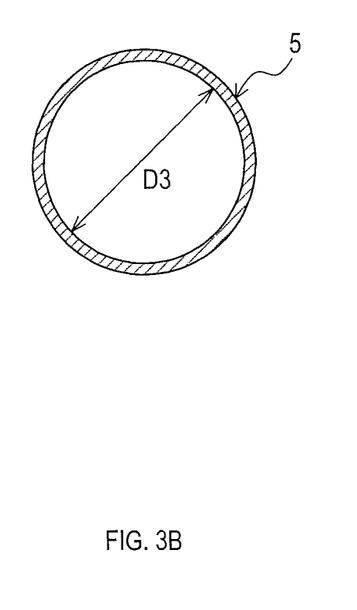
FIG. 3B is a schematic sectional view taken along line IIIB-IIIB of FIG. 1.

The relations of an equivalent diameter D1 in a cross section perpendicular to the gas flow direction in the main chamber 3, an equivalent diameter D2 in a cross section perpendicular to the gas flow direction in the sub chamber 4, and an equivalent diameter D3 in a cross section perpendicular to the gas flow direction in the intermediate chamber 5 shown in FIG. 3A and FIG. 3B are described below in Equation (2).

$$D2 \geq D3, D1 > D3 \quad (2)$$

That is, the equivalent diameter D3 of the intermediate chamber 5 is equal to or less than the equivalent diameter D2 of the sub chamber 4, and less than the equivalent diameter D1 of the main chamber 3. In the present embodiment, the equivalent diameter D2 is less than the equivalent diameter D1 (D2<D1); however, the equivalent diameter D2 may be equal to or more than the equivalent diameter D (D2≥D1).

In the intermediate chamber 5, a ratio of the length L3 [mm] to the equivalent diameter D3 [mm], i.e. L3/D3 is equal to or less than 1. On the other hand, a ratio of the length L2 [mm] to the equivalent diameter D2 [mm] in the sub chamber 4, i.e. L2/D2 is more than 1, and a ratio of the length L1 [mm] to the equivalent diameter D1 [mm] in the main chamber 3, i.e. L1/D1 is more than 1.

<Adsorbent>

Each of the first adsorbent 7, the second adsorbent 8, and the third adsorbent 9 adsorbs the evaporated fuel and butane supplied with the air and the like to the canister 1. These adsorbents desorb the evaporated fuel and the butane by the introduced external air. The desorbed evaporated fuel is supplied to the engine.

Examples of the material of the first adsorbent 7, the second adsorbent 8, and the third adsorbent 9 may include well-known materials, such as activated carbon. Examples of the activated carbon may include an aggregate of granular activated carbon, a honeycomb-shaped molded activated carbon, and fibrous activated carbon molded into a sheet shape, a rectangular parallelepiped shape, a circular columnar shape, and a rectangular columnar shape.

An adsorption capacity of the third adsorbent 9 as a whole stored in the intermediate chamber 5 is smaller than an adsorption capacity of the first adsorbent 7 as a whole stored in the main chamber 3 and an adsorption capacity of the second adsorbent 8 as a whole stored in the sub chamber 4.

Here, "the adsorption capacity of the adsorbent as a whole" is obtained by multiplying an amount of evaporated fuel that the adsorbent per unit volume can adsorb by a volume of the adsorbent stored in each chamber. Therefore, the adsorption capacity of the adsorbent as a whole in each chamber can be adjusted by changing the adsorbent in each chamber to an adsorbent with a different adsorption capacity per unit volume, and/or by changing the volume of the adsorbent stored in each chamber.

Therefore, for the first adsorbent 7, the second adsorbent 8, and the third adsorbent 9, the same type of adsorbent may be used, or different types of adsorbent may be used.

After purging, the intermediate chamber 5 is required to be in a state where the evaporated fuel is not adsorbed. Thus, if the adsorption capacity of the intermediate chamber 5 is too high, the evaporated fuel remains after purging, which affects an adsorption performance later. In addition, from the viewpoint of downsizing of the canister 1, the intermediate chamber 5 should be made compact. From these perspectives, the adsorption capacity of the intermediate chamber 5 is made smaller than that of the main chamber 3. Furthermore, if the adsorption capacity of the intermediate chamber 5 is made small, the desorption of the evaporated fuel from the adsorbent improves.

[1-2. Effects]

In the embodiment detailed above, following effects can be obtained.

(1a) With the intermediate chamber 5, it is possible to delay the moving of the evaporated fuel, which was not adsorbed in the main chamber 3, to the sub chamber 4. Thus, it is possible to reduce the discharge of the evaporated fuel to the atmosphere. The adsorption capacity of the third adsorbent 9 as a whole in the intermediate chamber 5 is made smaller than the adsorption capacity of the first adsorbent 7 as a whole and the adsorption capacity of the second adsorbent 8 as a whole, and thus, the intermediate chamber 5 can be made compact. As a result, it is possible to inhibit the upsizing of the canister 1 while reducing the discharge of the evaporated fuel to the atmosphere.

(1b) Since the ratio of L3/D3 in the intermediate chamber 5 is equal to or less than 1, the ventilation resistance of the intermediate chamber 5 can be reduced. In addition, the length of the intermediate chamber 5 can be reduced, which promotes the effect of inhibiting the upsizing of the canister 1.

(1c) The equivalent diameter D3 of the intermediate chamber 5 is equal to or less than the equivalent diameter D2 of the sub chamber 4 and less than the equivalent diameter D1 of the main chamber 3, which enhances the desorption properties of the third adsorbent 9 in the intermediate chamber 5. As a result, an adsorption effect of the intermediate chamber 5 at the time of re-absorption of the evaporated fuel increases, which promotes the effect of reducing the discharge of the evaporated fuel to the atmosphere.

(1d) The intermediate chamber 5 is arranged inside the flow path forming member 11, which allows to form the intermediate chamber 5 utilizing a part of the structure of the flow path. Thus, it is possible to promote the effect of inhibiting the upsizing of the canister 1.

2. Second Embodiment

[2-1. Configuration]

Figure 4:
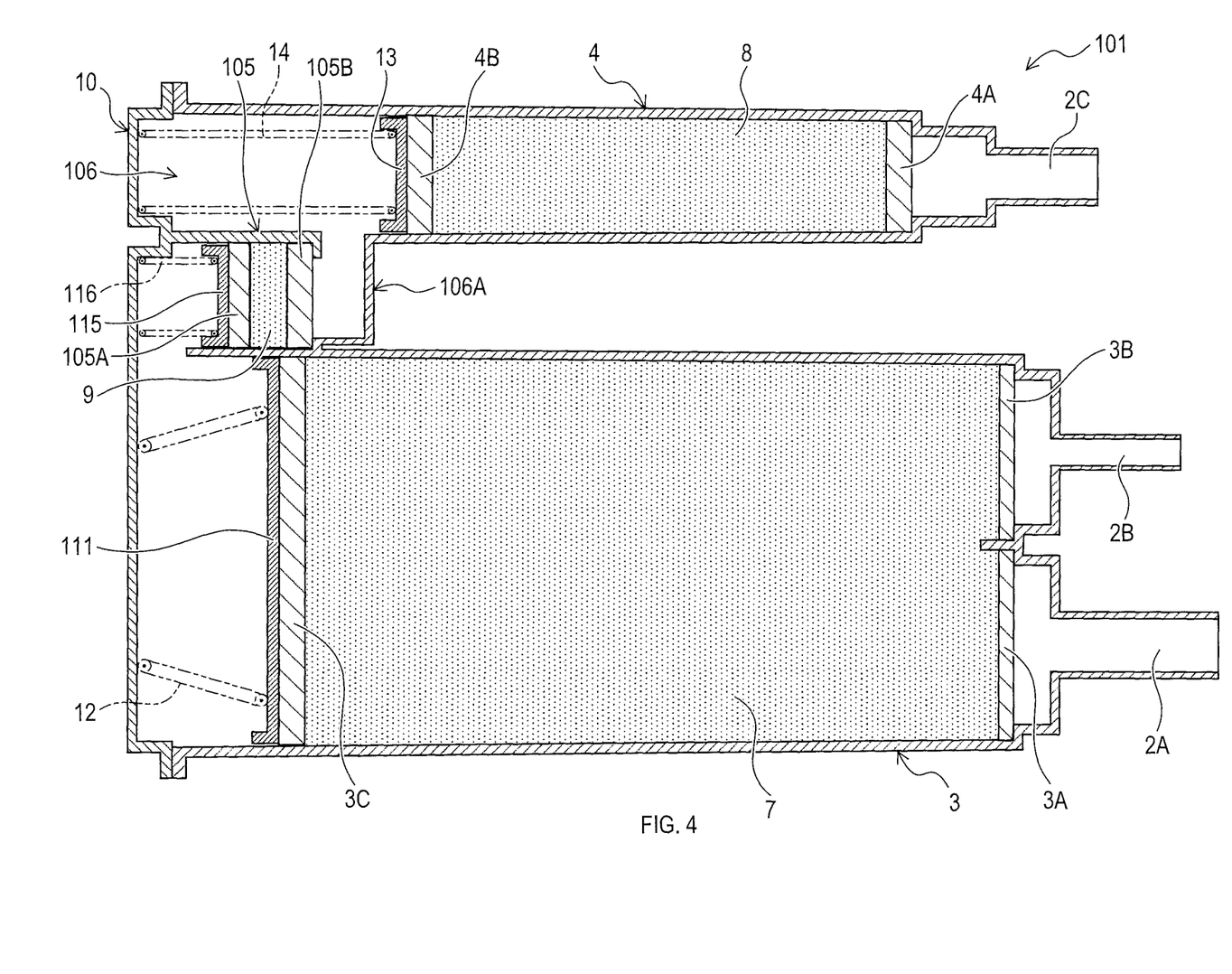
FIG. 4 is a schematic sectional view of a canister in an embodiment different from FIG. 1.

A canister 101 shown in FIG. 4 adsorbs and desorbs the evaporated fuel occurred in the fuel tank of the vehicle. The canister 101 includes a charge port 2A, a purge port 2B, an atmosphere port 2C, a main chamber 3, a sub chamber 4, an intermediate chamber 105, a communicating passage 106, a first adsorbent 7, a second adsorbent 8, and a third adsorbent 9.

The charge port 2A, purge port 2B, atmosphere port 2C, main chamber 3, sub chamber 4 and adsorbents 7, 8, 9 of the canister 101 are the same as those of the canister 1 of FIG. 1. Therefore, the same reference numerals are given to these components and the description thereof is omitted. In the present embodiment, the third filter 3C separating the main chamber 3 is pressed by a resin grid 111 having a grid shape instead of the flow path forming member 11 of FIG. 1.

<Intermediate Chamber>

The intermediate chamber 105 is arranged between the main chamber 3 and the sub chamber 4 in the flow path of the evaporated fuel and is connected to each of the main chamber 3 and the sub chamber 4 through spaces.

The intermediate chamber 105 is arranged inside a crank portion 106A of the communicating passage 106. Specifically, the intermediate chamber 105 is defined by a first filter 105A and a second filter 105B arranged in an intermediate part of the crank portion 106A.

The first filter 105A separates an area near the main chamber 3 in the communicating passage 106 from a storage space for the adsorbent of the intermediate chamber 105. The second filter 105B separates an area near the sub chamber 4 in the communicating passage 106 from the storage space for the adsorbent of the intermediate chamber 105.

The first filter 105A is pressed toward the second filter 105B by a third spring 116 through a resin grid 115 having a grid shape. The second filter 105B is supported by an interior wall constituting the crank portion 106A of the communicating passage 106.

In the intermediate chamber 105, a third adsorbent 9 the same as that of the first embodiment is stored. The relations between the length and equivalent diameter of the intermediate chamber 105 and the length and equivalent diameter of each of the main chamber 3 and the sub chamber 4 are the same as those of the first embodiment.

<Communicating Passage>

The communicating passage 106 is a space to connect main chamber 3 and the sub chamber 4 to communicate with each other. The communicating passage 106 has the S-shaped crank portion 106A.

In the crank portion 106A, a direction of the gas flow passed through the main chamber 3 is bent from a radial direction of the main chamber 3 (i.e. in an up-down direction of FIG. 4) to a direction parallel to the gas flow direction in the main chamber 3 (i.e. in a left-right direction of FIG. 4), and thereafter, the direction is further bent to the radial direction of the main chamber 3.

In the crank portion 106A, the intermediate part in which the gas flow direction is parallel to the gas flow direction in the main chamber 3 has the intermediate chamber 105 arranged therein as described above. The intermediate part (i.e. the intermediate chamber 105) of the crank portion 106A is arranged between the main chamber 3 and the sub chamber 4 in the radial direction of the main chamber 3.

[2-2. Effects]

In the embodiment detailed above, following effects can be obtained.

(2a) The intermediate chamber 105 can be formed by utilizing a part of the communicating passage 106. Thus, it is possible to promote the effect of inhibiting the upsizing of the canister 101. The intermediate chamber 105 is arranged in the crank portion 106A of the communicating passage 106, which makes it possible for the main chamber 3 and the sub chamber 4 to have structures similar to the conventional structures.

3. Third Embodiment

[3-1. Configuration]

Figure 5:
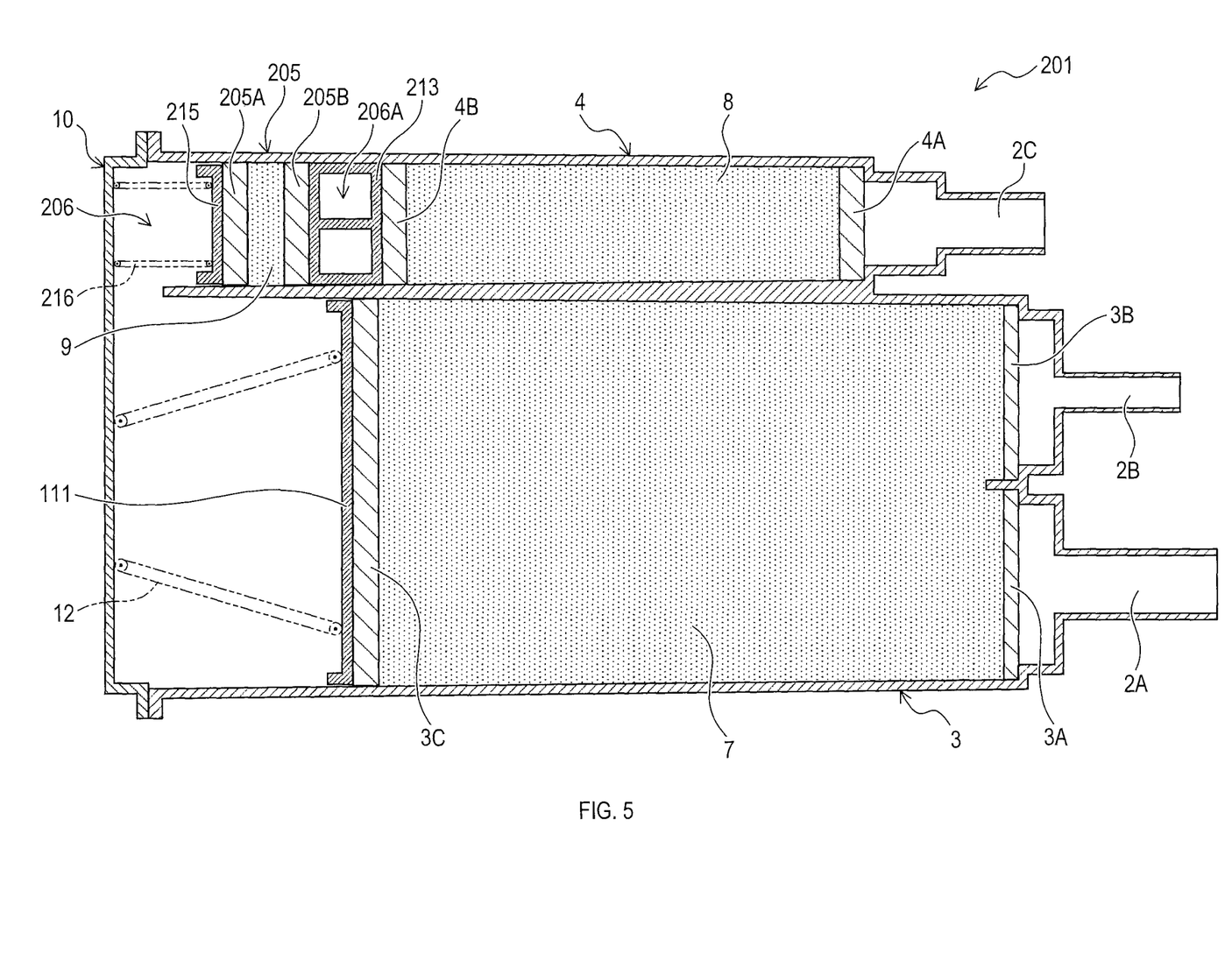
FIG. 5 is a schematic sectional view of a canister in another embodiment different from FIG. 1.

A canister 201 shown in FIG. 5 adsorbs and desorbs the evaporated fuel occurred in the fuel tank of the vehicle. The canister 201 includes a charge port 2A, a purge port 2B, an atmosphere port 2C, a main chamber 3, a sub chamber 4, an intermediate chamber 205, a communicating passage 206, a first adsorbent 7, a second adsorbent 8, and a third adsorbent 9.

The charge port 2A, purge port 2B, atmosphere port 2C, main chamber 3, sub chamber 4 and adsorbents 7, 8, 9 of the canister 201 are the same as those of the canister 101 of FIG. 4. Therefore, the same reference numerals are given to these components and the description thereof is omitted.

<Intermediate Chamber>

The intermediate chamber 205 is arranged between the main chamber 3 and the sub chamber 4 in the flow path of the evaporated fuel and is connected to each of the main chamber 3 and the sub chamber 4 through spaces.

The intermediate chamber 205 is arranged in the linear part 206A of the communicating passage 206. Specifically, the intermediate chamber 205 is defined by a first filter 205A and a second filter 205B arranged in the linear part 206A.

The first filter 205A separates an area near the main chamber 3 in the linear part 206A from a storage space for the adsorbent of the intermediate chamber 205. The second filter 205B separates an area near the sub chamber 4 in the linear part 206A from the storage space for the adsorbent of the intermediate chamber 205.

The first filter 205A is pressed toward the sub chamber 4 by a third spring 216 through a resin grid 215 having a grid shape. In this embodiment, the third spring 216 also serves as a spring (i.e. the second spring 14 of FIG. 4) pressing the second filter 4B defining the sub chamber 4.

Figure 6:
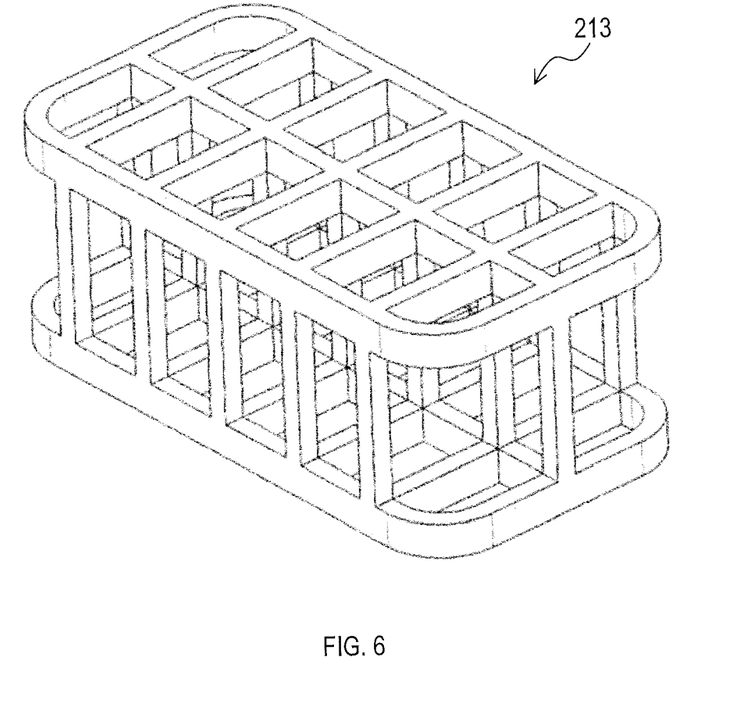
FIG. 6 is a schematic perspective view of a partition grid in the canister of FIG. 5.

The second filter 205B is pressed by a resin partition grid 2B arranged between the sub chamber 4 and the intermediate chamber 205. As shown in FIG. 6, the partition grid 2B has a three-dimensional grid shape.

The partition grid 2B passes the evaporated fuel in the direction the same as the gas flow direction in the sub chamber 4. With the partition grid 2B, a buffer space without an adsorbent is arranged between the sub chamber 4 and the intermediate chamber 205. This buffer space can delay the discharge of the evaporated fuel to the atmosphere.

As shown in FIG. 5, in the intermediate chamber 205, a third adsorbent the same as that of the first embodiment is stored. The relations between the length and equivalent diameter of the intermediate chamber 205 and the length and equivalent diameter of each of the main chamber 3 and the sub chamber 4 are the same as those of the first embodiment.

<Communicating Passage>

The communicating passage 206 is a space to connect the main chamber 3 and the sub chamber 4 to communicate with each other. The communicating passage 206 has a linear part 206A that is aligned linearly with the sub chamber 4 on the side opposite the atmosphere port 2C of the sub chamber 4.

The gas flow direction in the linear part 206A is parallel to the gas flow direction in the sub chamber 4. The linear part 206A overlaps with the sub chamber 4 in the gas flow direction of the sub chamber 4 (i.e. in the left-right direction in FIG. 5). In the linear part 206A, the intermediate chamber 205 and the partition grid 2B are arranged as described above. The intermediate chamber 205 is arranged so as to be shifted from the main chamber 3 in the radial direction of the main chamber 3.

[3-2. Effects]

In the embodiment detailed above, following effects can be obtained.

(3a) The intermediate chamber 205 can be formed by utilizing a part of the communicating passage 206. Thus, it is possible to promote the effect of inhibiting the upsizing of the canister 201. The intermediate chamber 205 is arranged in the linear part 206A of the communicating passage 206, which makes it easy to arrange the intermediate chamber 205 and to hold the third adsorbent 9.

4. Other Embodiments

Although the embodiments of the present disclosure have been described above, it should be appreciated that the present disclosure is not limited to the above embodiments and can take various forms.

(4a) The canister of any one of the above described embodiments may additionally include an auxiliary chamber storing an adsorbent between the sub chamber and the atmosphere port. That is, the atmosphere port may be connected to the sub chamber through another chamber (i.e. the auxiliary chamber).

(4b) A function served by a single element in any of the above-described embodiments may be achieved by a plurality of elements, or a function served by a plurality of elements may be achieved by a single element. A part of the configurations of the aforementioned embodiments may be omitted. At least part of the configurations of the aforementioned embodiments may be added to or replaced with the configurations of the other above-described embodiments. It should be noted that all modes included in the technical idea specified from the wording described in the claims are embodiments of the present disclosure.

What is claimed is:

1. A canister for absorbing and desorbing evaporated fuel occurred in a fuel tank of a vehicle, the canister comprising:
   a charge port that takes in the evaporated fuel;
   a purge port that discharges the evaporated fuel;
   an atmosphere port open to the atmosphere;
   a main chamber to which the charge port and the purge port are connected;
   a sub chamber to which the atmosphere port is connected directly or through another chamber;
   an intermediate chamber arranged between the main chamber and the sub chamber in a flow path of the evaporated fuel, the intermediate chamber being connected to each of the main chamber and the sub chamber;
   a first adsorbent stored in the main chamber;
   a second adsorbent stored in the sub chamber;
   a third adsorbent stored in the intermediate chamber;
   a communicating passage that connects the intermediate chamber and the sub chamber to communicate with each other and bends a gas flow direction;
   a flow path forming member connected to an end of the main chamber on a side opposite the charge port of the main chamber; and
   a spring that presses the flow path forming member toward the main chamber,
   wherein the flow path forming member has a tapered portion that is reduced in diameter toward a side opposite the main chamber,
   wherein the intermediate chamber is defined by two filters arranged inside the tapered portion of the flow path forming member, and
   wherein an adsorption capacity of the third adsorbent as a whole is smaller than each of an adsorption capacity of the first adsorbent as a whole and an adsorption capacity of the second adsorbent as a whole.

2. The canister according to claim 1,
   wherein in the intermediate chamber, a ratio (L/D) of a length L [mm] in a gas flow direction to an equivalent diameter D [mm] in a cross section perpendicular to the gas flow direction is equal to or less than 1.

3. The canister according to claim 1,
   wherein the equivalent diameter in the cross section perpendicular to the gas flow direction in the intermediate chamber is equal to or less than an equivalent diameter in a cross section perpendicular to a gas flow direction in the sub chamber and less than an equivalent diameter in a cross section perpendicular to a gas flow direction in the main chamber.

4. A canister for absorbing and desorbing evaporated fuel occurred in a fuel tank of a vehicle, the canister comprising:
   a charge port that takes in the evaporated fuel;
   a purge port that discharges the evaporated fuel;
   an atmosphere port open to the atmosphere;
   a main chamber to which the charge port and the purge port are connected;
   a sub chamber to which the atmosphere port is connected directly or through another chamber;
   an intermediate chamber arranged between the main chamber and the sub chamber in a flow path of the evaporated fuel, the intermediate chamber being connected to each of the main chamber and the sub chamber;
   a first adsorbent stored in the main chamber;
   a second adsorbent stored in the sub chamber;
   a third adsorbent stored in the intermediate chamber;
   a communicating passage that connects the main chamber and the sub chamber to communicate with each other, wherein the communicating passage has an S-shaped crank portion that bends a gas flow direction, wherein, in the crank portion, a direction of the gas flow passed through the main chamber is bent from a radial direction of the main chamber perpendicular to the gas flow direction to a direction parallel to the gas flow direction in the main chamber, and thereafter, the direction is further bent to the radial direction of the main chamber, wherein the intermediate chamber is arranged in the crank portion, and wherein an adsorption capacity of the third adsorbent as a whole is smaller than each of an adsorption capacity of the first adsorbent as a whole and an adsorption capacity of the second adsorbent as a whole.

* * * * *